United States Patent [19]
Ohnishi et al.

[11] Patent Number: 5,589,320
[45] Date of Patent: Dec. 31, 1996

[54] POLYMERIC FLUORESCENT SUBSTANCE AND ORGANIC ELECTROLUMINESCENCE DEVICES USING THE SAME

[75] Inventors: Toshihiro Ohnishi; Takanobu Noguchi; Shuji Doi, all of Tsukuba, Japan

[73] Assignee: Sumitomo Chemical Company, Limited, Osaka, Japan

[21] Appl. No.: 274,798

[22] Filed: Jul. 14, 1994

[30] Foreign Application Priority Data

Jul. 21, 1993 [JP] Japan ..................... 5-180247
Sep. 24, 1993 [JP] Japan ..................... 5-237851

[51] Int. Cl.[6] ..................................... G03C 5/00
[52] U.S. Cl. ................ 430/321; 528/101; 528/104; 257/40; 313/504; 430/313
[58] Field of Search ................ 257/40; 528/101, 528/104; 430/313, 321; 313/504

[56] References Cited

U.S. PATENT DOCUMENTS

| | | | |
|---|---|---|---|
| 5,247,190 | 9/1993 | Friend et al. | 257/40 |
| 5,317,169 | 5/1994 | Nakano et al. | 257/40 |
| 5,328,809 | 7/1994 | Holmes et al. | 430/321 |

FOREIGN PATENT DOCUMENTS

| | | | |
|---|---|---|---|
| 443861A2 | 8/1991 | European Pat. Off. | |
| 443861 | 10/1991 | European Pat. Off. | 257/40 |
| 9203490 | 5/1992 | WIPO | |
| 9306189 | 1/1993 | WIPO | |

OTHER PUBLICATIONS

"Electroluminescence from Phenylenevinylene-based Polymer Blends", by Vestweber et sl., Advanced Materials for optics and electronics, vol. 2, No. 4, Jul. 1993, pp. 197–204.

*Primary Examiner*—Samuel A. Acquah
*Attorney, Agent, or Firm*—Sughrue, Mion, Zinn, Macpeak & Seas

[57] ABSTRACT

A polymeric fluorescent substance which is soluble, has a number-average molecular weight of $10^3$–$10^7$ and contains three different repeating units —Ar—CH=CH—, wherein Ar is a arylene group having 6–20 carbon atoms, a heterocyclic compound group having 4–20 carbon atoms or a divalent group —$Ar_1$—$X_1$—R—$X_2$,—$Ar_2$. At least one of the repeating units has at least one substituent selected from alkyl, alkoxy and alkylthio groups having 2–22 carbon atoms, aryl and aryloxy groups having 6–60 carbon atoms and heterocyclic compound groups having 4–60 carbon atoms. $Ar_1$ and $Ar_2$ are each an arylene group having 6–20 carbon atoms or a heterocyclic compound group having 4–20 carbon atoms and may contain at least one substituent selected from alkyl, alkoxyl and alkylthio groups having 2–22 carbon atoms, aryl and aryloxy groups having 6–60 carbon atoms and heterocyclic compound groups having 4–60 carbon atoms. R is a hydrocarbon or heterocyclic compound group having 1–22 carbon atoms. $X_1$ and $X_2$ independently represent —O—, —S—, —COO— or —OCO—.

7 Claims, No Drawings

POLYMERIC FLUORESCENT SUBSTANCE AND ORGANIC ELECTROLUMINESCENCE DEVICES USING THE SAME

BACKGROUND OF THE INVENTION

1. Field of the Invention

The present invention relates to a polymeric fluorescent substance for organic electroluminescence devices (which may hereinafter be referred to as EL devices) and the EL devices produced by using such a substance. More particularly, the invention pertains to a polymeric fluorescent substance which is soluble in solvents and has strong fluorescence and the organic EL devices with high luminous efficiency produced by using said fluorescent substance.

2. Description of the Related Art

The inorganic electroluminescence devices (which may hereinafter be referred to as inorganic EL devices) using an inorganic fluorescent substance as light emitting material have been applied to various uses, for example, as flat light source for back-light of liquid crystal displays and various display devices such as flat panel displays, but in these devices a high-voltage alternating current has been required for driving the devices.

Recently, Tang et al manufactured an organic EL device having a double-layer structure comprising a laminate of a light emitting layer made of an organic fluorescent dye and a layer of an organic charge transport compound generally used in a photosensitive layer for electrophotography to realize a low-voltage-drive, high-efficiency and high-luminance organic EL device. In view of many advantageous features of organic EL devices as compared with inorganic EL devices, such as low-voltage drive, high luminance and easy luminescence of a large number of colors, various attempts have been made and reported regarding development and improvements of structure of the devices, organic fluorescent dyes, organic charge transport compounds, etc. (Jpn. J. Appl. Phys., Vol. 27, L269, 1988; J. Appl. Phys., Vol. 65, 3610, 1989, etc.).

Hitherto, low-molecular weight organic fluorescent dyes have been generally used as material of the light emitting layer, and regarding polymeric light emitting materials, proposals have been made in some patents and publications such as WO9013148, JP-A-3-244630 and Appl. Phys. Lett., Vol. 58, p. 1982 (1991). WO9013148 discloses an EL device using a thin film of poly(p-phenylene vinylene) obtained by forming a film of a soluble precursor on the electrode and subjecting it to a heat treatment to convert the precursor into a conjugated polymer.

JP-A-3-244630 illustrates conjugated polymers having a salient feature that they are themselves soluble in solvents and unnecessitate heat treatment. In Appl. Phys. Lett., Vol. 58, p. 1982 (1991), are also disclosed polymeric light emitting materials soluble in solvents and organic EL devices made by using such materials. Most of the organic EL devices manufactured by using these materials, however, were not satisfactorily high in luminous efficiency.

Regarding quantum yield of fluorescence of poly(p-phenylene vinylene) (which may hereinafter be referred to as PPV), it has been reported that the quantum yield of fluorescence and EL intensity can be improved by using a copolymer of PPV in which a non-conjugated segment is interposed in the conjugated segment. Control of the chain length of the conjugated segment and non-conjugated segment is made by making use of a difference in decomposition temperature of the precursors of the conjugated polymers used for the respective segments (Nature, Vol. 356, p. 47 (1992)). It is also disclosed that by heat treating a copolymer of p-phenylene-ethylene-sulfonium salt and 2,5-dimethoxy-p-phenylene-methoxy-ethylene, there is produced a poly(p-phenylene vinylene) portion encompassed by the 2,5-dimethoxy-p-phenylene-methoxy-ethylene-methoxy-ethylene moiety, and this elevates EL intensity as compared with PPV homopolymer. Here, since the 5-dimethoxy-p-phenylene-methoxy-ethylene moiety in the copolymer is hard to decompose by heat treatment alone, it is utilized for inhibiting the copolymer from being converted in its entirety into a conjugated polymer by the heat treatment.

It is further reported that a polymer in which the conjugated monomeric moiety with strong fluorescence and aliphatic hydrocarbons are coupled by ether linkage generates blue fluorescent light because of its short conjugated chain length, and a blue light-emitting organic EL device can be made by using said polymer (Macromolecules, Vol. 26, p. 1188, 1993).

However, in manufacture of the organic EL devices using polymers which have hitherto been reported, it was necessary to mold a soluble precursor into a thin film and convert its structure into a conjugated polymeric structure by high-temperature heat treatment, so that there have been restrictions on the material usable for the associated parts such as substrate in manufacture of the device. Also, when a precursor polymer is converted into a conjugated polymer by heat treatment, control of the non-conjugated moiety in the polymer has been made by adjusting the heat treatment conditions, so that such control has not been perfect, and when said polymer was used for an organic EL device, it might suffer a structural change in long-time continuous run.

When using a polymer in which the conjugated monomeric moiety is coupled with non-conjugated aliphatic hydrocarbons by ether linkage, the obtained thin film is high in resistance and low in current density, so that high luminance can hardly be obtained in the EL devices using the said polymer.

In the case of soluble conjugated polymers, although no high-temperature heat treatment is necessary after formation of the thin film, further improvements are required on luminance and luminous efficiency of the produced EL devices.

Thus, an organic EL device which can be easily made according to a coating method by using a polymeric fluorescent substance having good solubility in solvents, high quantum yield of fluorescence and excellent electric conductive property has been desired.

SUMMARY OF THE INVENTION

The object of the present invention, therefore, is to provide a polymeric fluorescent substance having good solubility in solvents and high quantum yield of fluorescence and operable with low drive voltage, and organic EL devices of high luminous efficiency which can be easily made according to a coating method by using said fluorescent substance.

In view of the above circumstances, the present inventors have made efforts for improving luminous efficiency of organic EL devices using a polymeric fluorescent substance for the light emitting layer, and as a result, found that a copolymer having side chain groups and containing three or more different types of specific structures in a specific ratio in the main chain is high in quantum yield of fluorescence, and by using such a copolymer as polymeric fluorescent substance, it is possible to easily make an organic EL device having the desired properties according to a coating method. The present invention has been attained on the basis of this finding.

The present invention comprehends the following embodiments.

(i) A polymeric fluorescent substance which is soluble in solvents, has a number-average molecular weight of $10^3$ to $10^7$ and contains, as main constituents, three different types of repeating units A, B and C selected from various repeating units represented by the formula (1) shown below, wherein the ratios of the respective repeating units in the polymeric substance are such that when the repeating unit constituting the polymer having the longest optical absorption edge wavelength is expressed by A, the repeating unit constituting the polymer having the next longest optical absorption edge wavelength is expressed by B and the repeating unit constituting the polymer having the shortest optical absorption edge wavelength is expressed by C, A is contained in an amount of 2–60 mol %, B in an amount of 5–60 mol % and C in an amount of 20–50 mol % based on the total number of the three types of repeating units:

  (1)

wherein Ar is a arylene group having 6 to 20 carbon atoms, a heterocyclic compound group having 4 to 20 carbon atoms or a divalent group represented by the following formula (2), and at least one of A, B and C has at least one substituent selected from alkyl, alkoxy and alkylthio groups having 2 to 22 carbon atoms, aryl and aryloxy groups having 6 to 60 carbon atoms and heterocyclic compound groups having 4 to 60 carbon atoms

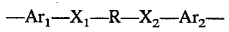  (2)

wherein $Ar_1$ and $Ar_2$ are each a arylene group having 6 to 20 carbon atoms or a heterocyclic compound group having 4 to 20 carbon atoms and may contain at least one substituent of at least one species of groups selected from alkyl, alkoxy and alkylthio groups having 2 to 22 carbon atoms, aryl and aryloxy groups having 6 to 60 carbon atoms and heterocyclic compound groups having 4 to 60 carbon atoms; R is a hydrocarbon or heterocyclic compound group having 1 to 22 carbon atoms; and $X_1$ and $X_2$ represent independently —O—, —S—, —COO— or —OCO—.

(ii) A polymeric fluorescent substance set forth in (i), wherein $X_1$ and $X_2$ in the formula (2) is —O—.

(iii) A polymeric fluorescent substance set forth in (i), wherein Ar's of the repeating units A, B and C are an arylene group having 6 to 20 carbon atoms or a heterocyclic compound group having 4 to 20 carbon atoms, at least one of the Ar's having at least one substituent of at least one species of group selected from alkyl, alkoxy and alkylthio groups having 2 to 22 carbon atoms, aryl and aryloxy groups having 6 to 60 carbon atoms and heterocyclic compound groups having 4 to 60 carbon atoms, and a difference between the peak wavelength of the absorption spectrum and the peak wavelength of the fluorescent spectrum of the thin film of said polymeric fluorescent substance is 120 nm or greater.

(iv) A polymeric fluorescent substance set forth in (iii), containing the repeating units represented by the following formulae (3) and (4):

  (3)

  (4)

wherein $Ar_3$, $Ar_4$ and $Ar_5$ are different from each other and each represent an arylene or heterocyclic compound group forming a conjugated bond linked to the vinylene group, and at least one of $Ar_3$, $Ar_4$ and $Ar_5$ is an arylene or heterocyclic compound group having at least one substituent of at least one species of group selected from alkyl, alkoxy and alkylthio groups having 2 to 22 carbon atoms, aryl and aryloxy groups having 6 to 60 carbon atoms and heterocyclic compound groups having 4 to 60 carbon atoms.

(v) An organic electroluminescence device at least having a light emitting layer between the electrodes consisting of an anode and a cathode forming a counterpart thereto at least one of which electrodes is transparent or semi-transparent, wherein the light-emitting layer comprises a polymeric fluorescent substance set forth in (i), (ii), (iii) or (iv).

(vi) An organic electroluminescence device at least having a light emitting layer between the electrodes consisting of an anode and a cathode forming a counterpart thereto at least one of which electrodes is transparent or semi-transparent, wherein the light emitting layer comprises a polymeric fluorescent substance set forth in (i), (ii), (iii) or (iv), and a layer comprising an electron transport compound is provided between the cathode and the light emitting layer and adjacent to the light emitting layer.

(vii) An organic electroluminescence device at least having a light emitting layer between the electrodes consisting of an anode and a cathode forming a counterpart thereto at least one of which electrodes is transparent or semi-transparent, wherein the light emitting layer comprises a polymeric fluorescent substance set forth in (i), (ii), (iii) or (iv), and a layer comprising a hole transport compound is provided between the anode and the light emitting layer and adjacent to the light emitting layer.

(viii) An organic electroluminescence device at least having a light emitting layer between the electrodes consisting of an anode and a cathode forming a counterpart thereto at least one of which electrodes is transparent or semi-transparent, wherein the light emitting layer comprises a polymeric fluorescent substance set forth in (i), (ii), (iii) or (iv), a layer comprising an electron transport compound is provided between the cathode and the light emitting layer and adjacent to the light emitting layer, and a layer comprising a hole transport compound is provided between the anode and the light emitting layer and adjacent to the light emitting layer.

The polymeric fluorescent substance of the present invention has strong fluorescence and is soluble in organic solvents, and it is usable as a light emitting material in organic EL devices, a dye for a dye laser, and so on. Also, since a homogeneous light emitting layer can be easily formed by a coating method, the organic EL devices of high luminous efficiency according to the present invention can be manufactured very easily.

Further, since the organic EL devices according to this invention use a conjugated polymeric fluorescent substance with high quantum yield of fluorescence and excellent electrically conductive property, these devices show excellent luminous properties and are preferably used as flat light source as a backlight of liquid crystal displays, flat panel display and the like.

DESCRIPTION OF THE PREFERRED EMBODIMENTS

The polymeric fluorescent substance according to the present invention is described in detail below.

The polymeric fluorescent substance of this invention contains three different types of repeating units A, B and C selected from various repeating units represented by formula (1). Regarding light absorption edge wavelength of the polymers composed of the above repeating units, the fact is to be noted that the absorption edge is present at the longest wavelength in the polymer comprising the repeating units A, and at the second longest wavelength in the polymer comprising the repeating units B. In the case of the polymer comprising the repeating units C, the absorption edge is at the shortest wavelength. As for the ratio of the repeating units A, B and C of the polymers, the respective repeating units are contained so that A will be 2–60 mol %, B will be 5–60 mol % and C will be 20–50 mol % based on the total number of the three types of repeating units, the total of A, B and C being 100 mol % or less, based on the total number of all types of repeating units which are contained in the polymer.

In the EL devices using the polymeric fluorescent substance of the present invention, since luminescence in the visible region is utilized, the maximum peak wavelength of the fluorescent spectrum of the polymeric fluorescent substance in the solid state is preferably in a range of 400 to 800 nm.

The conjugated polymeric fluorescent substance of the present invention is a conjugated polymer soluble in solvents and having a number-average molecular weight of $10^3$ to $10^7$. The number-average molecular weight shown here is a value calculated as polystyrene by gel permeation chromatography (GPC) using chloroform as solvent.

In the polymeric fluorescent substance of this invention, when Ar in formula (1) is represented by formula (2), the fluorescent substance has a non-conjugated moiety and the conjugated chain length varies depending on its ratio. A short conjugated chain length is preferred for obtaining a polymeric fluorescent substance with a high quantum yield of fluorescence, but a long chain length is desirable from the viewpoint of charge transfer. In view of this, it is desirable that the repeating units containing Ar of formula (2) hold 75 mol % or less, preferably 50 mol % or less of the whole repeating units.

In the polymeric fluorescent substance of this invention, when Ar's of formula (1) of the repeating units A, B and C are all arylene group or heterocyclic compound group, the polymeric fluorescent substance is of a structure with continuous conjugated bonds and has three or more different types of repeating units, each of the repeating units having at least one conjugated bond. In a preferred embodiment of the polymeric fluorescent substance of this invention, a difference between the peak wavelength of absorption spectrum and the peak wavelength of fluorescent spectrum of the thin film of the fluorescent substance is 120 nm or greater. A more preferred embodiment of the polymeric fluorescent substance of this invention has a structure in which the vinylene group and the arylene group or heterocyclic compound group represented by the formulae (3) and (4), respectively, are bonded alternatively to form a repeating unit.

Further, by selecting those of the above repeating units in which a difference between optical absorption edge energy of the polymer mainly composed of the repeating units A and that of the polymer mainly composed of the repeating units C is 0.05 eV or greater, it is possible to obtain a light emitting material with high quantum yield of fluorescence.

Ar's of A, B and C should not be same in chemical structure at the same time and need to be selected from at least three different chemical structures. As the repeating unit structures differing in optical absorption edge energy by 0.05 eV or more, in case Ar's have substituents, there can be exemplified those structures in which at least one of their substituents is an alkoxy group, an alkylthio group, an aryloxy group or a heterocyclic compound group with 4 or more carbon atoms, or one or two of Ar's of A, B and C is a heterocyclic compound group.

In the case of $Ar_3$, $Ar_4$ and $Ar_5$ in the formulae (3) and (4), all of these Ar's are made different from each other and at least one of them is allowed to have a substituents, with at least one of such substituents being selected from alkoxyl groups, alkylthio groups, aryloxy groups and heterocyclic compounds group with 4 or more carbon atoms, or one of $Ar_3$ and $Ar_5$ is made a heterocyclic compound group, for obtaining a polymeric fluorescent substance with high quantum yield of fluorescence.

In the polymeric fluorescent substance of this invention, as examples of Ar of formula (1) other than those represented by formula (2) and examples of $Ar_1$ and $Ar_2$ of formula (2) when Ar of formula (1) is represented by formula (2), there can be mentioned arylene group having 6 to 20 carbon atoms and heterocyclic compound group having 4 to 20 carbon atoms such as divalent aromatic compound groups of formula (5) or their derivative groups and divalent heterocyclic compound groups or their derivative groups:

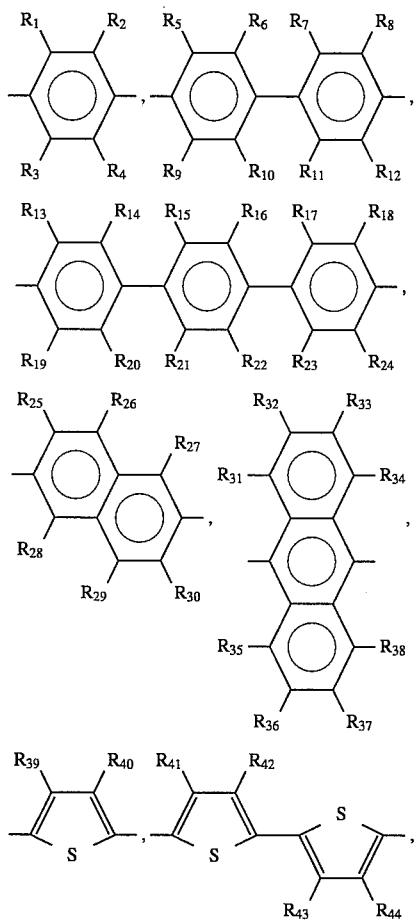

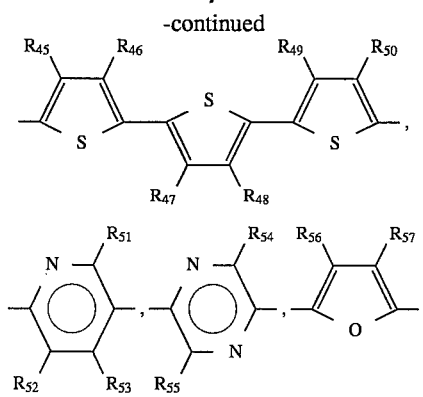

wherein $R_1$ to $R_{57}$ are each a group selected from the group consisting of hydrogen, alkyl, alkoxy and alkylthio groups having 1 to 20 carbon atoms, aryl and aryloxy groups having 6 to 18 carbon atoms, and heterocyclic compound groups having 4 to 14 carbon atoms.

Of these groups, phenylene, substituted phenylene, biphenylene, substituted biphenylene, naphthalenediyl, substituted naphthalenediyl, anthracene-9,10-diyl, substituted anthracene-9,10-diyl, pyridine-2,5-diyl, substituted pyridine-2,5-diyl, thienylene and substituted thienylene groups are preferred. Phenylene, biphenylene, naphthalenediyl, pyridine-2,5-diyl and thienylene groups are especially preferred.

Referring to substituent groups, examples of alkyl groups having 1 to 20 carbon atoms include methyl, ethyl, propyl, butyl, pentyl, hexyl, heptyl, octyl and lauryl and the like. Of these groups, methyl, ethyl, pentyl, hexyl, heptyl and octyl are preferred.

Examples of alkoxy groups having 1 to 20 carbon atoms include methoxy, ethoxy, propoxy, butoxy, pentyloxy, hexyloxy, heptyloxy, octyloxy and lauryloxy and the like. Of these groups, methoxy, ethoxy, pentyloxy, hexyloxy, heptyloxy and octyloxy are preferred.

Examples of alkylthio groups having 1 to 20 carbon atoms include methylthio, ethylthio, propylthio, butylthio, pentylthio, hexylthio, heptylthio, octylthio and laurylthio and the like. Of these groups, methylthio, ethylthio, pentylthio, hexylthio, heptylthio and octylthio are preferred.

Examples of aryl groups include phenyl, 4-$C_{1-12}$ alkoxyphenyl (wherein $C_{1-12}$ represents that alkoxy has 1 to 12 carbon atom(s)), 4-$C_{1-12}$ alkylphenyl (wherein $C_{1-12}$ represents that alkyl has 1 to 12 carbon atom(s)), 1-naphthyl and 2-naphthyl groups.

An example of aryloxy groups is phenoxy.

Examples of heterocyclic compound groups of the substituent include 2-thienyl, 2-pyrrolyl, 2-furyl and 2-, 3- or 4-pyridyl.

The polymers of this invention may be random, block or graft copolymers or the polymers having a structure intermediate between those of said copolymers, for example, block-type random copolymers. Block-type random copolymers or block or graft copolymers are more suited than perfect random copolymers for obtaining copolymers with high quantum yield of fluorescence. A repeating unit of alternating copolymers of two components among the three repeating units can be used preferably in the block and block-type random copolymers.

In the polymeric fluorescent substance of this invention, for obtaining a polymer with good film-forming properties such as solubility in solvents, at least one of Ar's of A, B and C should be an arylene or heterocyclic compound group which has its aromatic nuclear substituted at least at one position with a substituent selected from alkyl, alkoxy and alkylthio groups having 2 to 22 carbon atoms, aryl and aryloxy groups having 6 to 60 carbon atoms, and heterocyclic compound groups having 4 to 60 carbon atoms.

In case Ar of formula (1) is represented by formula (2), since the main chain has a rigid conjugated portion and a flexible coupled portion, it is basically not difficult to form a film by dissolving the polymeric substance in a solvent, but for obtaining a polymer with excellent solubility and film-forming properties, it is desirable that an arylene or heterocyclic compound group which has its aromatic nuclear substituted at least at one position with a substituent selected from alkyl, alkoxy and alkylthio groups having 2 to 22 carbon atoms, aryl and aryloxy groups having 6 to 60 carbon atoms and heterocyclic compound groups having 4 to 60 carbon atoms be contained in an amount of at least one per one conjugated portion or per molecular weight of 600.

From the viewpoint of obtaining a copolymer with high solubility, the content of the repeating units having these substituents in the polymeric substance is preferably 5 to 100 mol %, preferably 15 to 100 mol %.

Examples of good solvents for the polymeric fluorescent substance of this invention are chloroform, methylene chloride, dichloroethane, tetrahydrofuran, toluene and the like. The polymeric fluorescent substance of this invention can be dissolved in these solvents usually by 0.1 wt % or more, although the solubility differs depending on the structure and molecular weight of the fluorescent substance.

Examples of the substituents include the following: As examples of alkyl groups having 2 to 60 carbon atoms, there can be mentioned ethyl, propyl, butyl, pentyl, hexyl, heptyl, octyl, lauryl and the like, of which pentyl, hexyl, heptyl and octyl are preferred. As examples of alkoxyl groups, there can be mentioned ethoxy, propyloxy, butoxy, pentyloxy, hexyloxy, heptyloxy, octyloxy, lauryloxy and the like, of which pentyloxy, hexyloxy, heptyloxy and octyloxy are preferred. As examples of alkylthio groups, there can be mentioned ethylthio, propylthio, butylthio, pentylthio, hexylthio, heptylthio, octylthio, laurylthio, and the like, of which pentylthio, hexylthio, heptylthio and octylthio are preferred. As examples of aryl groups having 6 to 60 carbon atoms there can be mentioned phenyl, 4-$C_{1-12}$ alkoxyphenyl, 4-$C_{1-12}$ alkylphenyl, 1-naphthyl, 2-naphthyl and the like. As an example of aryloxy groups, phenoxy is mentioned. As examples of heterocyclic compound groups having 4 to 60 carbon atoms, there can be mentioned 2-thienyl, 2-pyrrolyl, 2-furyl, and 2-, 3- or 4-pyridyl.

In case Ar of formula (1) is represented by formula (2), R in formula (2) is a hydrocarbon or heterocyclic compound group having 1 to 22 carbon atoms, and $X_1$ and $X_2$ are independently a group of the formula —O—, —S—, —COO— or —OCO—. In view of solubility, stability and easiness of synthesis, $X_1$ and $X_2$ of formula (2) are preferably —O—, —COO— or —OCO—, more preferably —O—.

Examples of the hydrocarbon groups represented by R in formula (2) include methylene, ethylene, propylene, butylene, pentylene, hexylene, heptylene, octylene, decylene, laurylene, vinylene, phenylene, napthylene, anthrylene and the like. Of these groups, propylene, butylene, heptylene, hexylene, heptylene, octylene, decylene and phenylene are preferred.

Examples of heterocyclic compound groups include thienylene, furan-2,5-diyl, pyridine-2,3-diyl, pyridine-2,4-diyl, pyridine-2,5-diyl, pyridine-2,6-diyl and the like.

The polymerization degree of the polymers of this invention is not specifically defined as it is variable depending on the repeating structural units and their ratio, but the number-average molecular weight is defined to be in a range of $10^3$ to $10^7$. Generally, it is desirable from the aspect of film-forming properties that the total number of the repeating units is 4 to 10,000, more preferably 4 to 3,000, even more preferably 5 to 2,000.

Use of these polymers soluble in organic solvents proves very advantageous in production of an organic EL device. That is, when a film is formed from the solution, it is merely required to remove the solvent by drying from the applied solution, and the same technique can be applied in case a charge transport material such as mentioned below is mixed.

The method for the synthesis of the polymeric fluorescent substance according to this invention is not specified, but in case Ar of formula (1) is represented by formula (2), such synthesis may be accomplished, for instance, by condensation polymerization of an arylene vinylene oligomer having OH or SH groups at both ends of the molecular chain and a hydrocarbon or heterocyclic compound having halide groups at both chain ends, condensation polymerization of an arylene vinylene oligomer having OH groups at both chain ends and a hydrocarbon or heterocyclic compound having COCl groups at both chain ends, or condensation polymerization of an arylene vinylene oligomer having COOH groups at both chain ends and a hydrocarbon or heterocyclic compound having halide groups at both chain ends. The structure of the arylene vinylene oligomer used must satisfy the above-defined conditions.

Another method for the synthesis of the polymeric fluorescent substance of this invention is to carry out Wittig reaction with compounds of formulae (6) and (7) and a compound of formula (8):

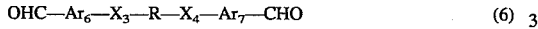
OHC—Ar$_6$—X$_3$—R—X$_4$—Ar$_7$—CHO        (6)

OHC—Ar$_8$—CHO        (7)

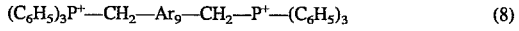
(C$_6$H$_5$)$_3$P$^+$—CH$_2$—Ar$_9$—CH$_2$—P$^+$—(C$_6$H$_5$)$_3$        (8)

wherein Ar$_6$, Ar$_7$, Ar$_8$ and Ar$_9$ are independently an arylene or heterocyclic compound group; R is a hydrocarbon or heterocyclic compound group having 1 to 22 carbon atoms; and X$_3$ and X$_4$ are independently —O—, —S—, —COO— or —OCO—.

Here, the compound of formula (6) and the compound of formula (8), and the compound of formula (7) and the compound of formula (8) may be bound adjacent to each other to form a vinylene group, but the compounds of the same structure or the compound of formula (6) and the compound of formula (7) will not be bound adjacent to each other. Therefore by properly selecting the ratio of the compound of formula (6) and the compound of formula (7), it is possible to change the conjugated chain length of the produced polymeric fluorescent substance.

Specifically, a synthesis process for an arylene vinylene copolymer containing ether linkage, which is a typical example of polymeric fluorescent substance of this invention, is elucidated below.

Described here is a process for obtaining an arylene vinylene copolymer containing ether linkage by condensation polymerization of an arylene vinylene oligomer having OH groups at both ends of the molecular chain and a hydrocarbon having halide groups at both ends of the molecular chain.

First, a bis(methyl halide) compound, for instance, 2,5-diheptyloxy-p-xylylene dibromide, is reacted with triphenylphosphine in N,N-dimethylformamide to synthesize a phosphonium salt, and this phosphonium salt is condensed with a dialdehyde compound and a hydroxyaldehyde compound, for instance, terephthalaldehyde and p-hydroxybenzaldehyde, in for example ethanol by using lithium ethoxide to carry out Wittig reaction to obtain an arylene vinylene oligomer having OH groups at both ends of the molecular chain.

Since the extent of the conjugation system can be controlled by adjusting the ratio of dialdehyde compound and hydroxyaldehyde compound, this ratio is properly adjusted considering the reactivity and intake rate of both compounds so that the conjugation system will fall in the specified region. Then the reaction product is further subjected to polycondensation with a hydrocarbon having halide groups at both ends of the molecular chain, for example 1,6-dibromo-n-hexane, to obtain an arylene vinylene copolymer containing ether linkage.

Two or more compounds for each component, that is two or more different diphosphonium salts, two or more different dialdehyde compounds or/and two or more different hydroxyaldehyde compounds, can be used to obtain the copolymers.

Another process for obtaining an arylene vinylene copolymer having ether linkage from Wittig reaction of a compound of formula (6) and the compounds of formulae (7) and (8) is illustrated below.

A bis(methyl halide) compound, for example, 2,5-diheptyloxy-p-xylylene dibromide, is reacted with triphenylphosphine in N,N-dimethylformamide to synthesize a phosphonium salt. Separately from this, a hydroxyaldehyde compound, for example, p-hydroxybenzaldehyde, is reacted with potassium hydroxide in ethanol to form potassium phenolate, and the latter is reacted with a hydrocarbon having halide groups at both ends of the molecular chain, for example, 1,6-dibromo-n-hexane, to synthesize a compound containing ether linkage and having aldehyde groups at both ends of the molecular chain. Then this compound and a dialdehyde compound of the conjugation system, for example, terephthalaldehyde, and the previously prepared phosphonium salt are condensed in ethanol using lithium ethoxide (Wittig reaction) to obtain an arylene vinylene copolymer containing ether linkage.

In this process, the extent of the conjugation system can be controlled by adjusting the ratio of the compound containing ether linkage and having aldehyde groups at both ends of the molecular chain and the aldehyde compound of the conjugation system, so that it is recommended to properly adjust the ratio by taking into consideration the reactivity and intake rate of both compounds so that the conjugation system will fall in the specified region. In this case, too, two or more compounds for each component, that is two or more different diphosphonium salts, two or more different hydroxyaldehyde compounds or/and two or more different dialdehyde compounds, can be used to obtain the copolymers.

When all of Ar's in formula (1) are arylene groups or heterocyclic compound groups, a typical example of polymeric fluorescent substance of this invention is an arylene vinylene copolymer. Its synthesis method is not specified in this invention, but the objective copolymer can be obtained in the same way as shown in JP-A-1-254734 and JP-A-1-79217. That is, for instance, two or more different bis(methyl halide) compounds, for example, 2,5-diethyl-p-xylylene dibromide, 2,5-diheptyloxy-p-xylylene dibromide and p-xylylene dibromide are copolymerized in a xylene/t-butyl alcohol mixed solvent by using t-butoxy-potassium (dehydrohalogenation method). In this case, usually a random copolymer is produced, but it is possible to obtain a block copolymer by using an oligomer.

There can also be employed a Wittig reaction process in which the corresponding bis(methyl halide) compounds, for example, 2,5-diethyl-p-xylylene dibromide and 2,5-diheptyloxy-p-xylylene dibromide are reacted respectively with triphenylphosphine in N,N-dimethylformamide to synthesize a phosphonium salt, and the corresponding dialdehyde compound, for example, terephthalaldehyde, is polymerized in ethyl alcohol by using lithium ethoxide. Two or more compounds for each component, that is two or more different diphosphonium salts or/and two or more different dialdehyde compounds, can be used to obtain the copolymers. It is also possible to employ the sulfonium salt decomposition method in which a corresponding sulfonium salt is polymerized in the presence of an alkali and the resulting product is subjected to a sulfonium salt removing treatment.

When these polymers are used as a light emitting material for organic EL devices, the luminous properties of the material are affected by the purity of the polymers, so that the synthesized polymer is preferably subjected to purification treatments such as reprecipitation and separation by chromatography.

Regarding the structure of the organic EL devices produced by using the light emitting material of this invention, there are imposed no specific restrictions and a known structure can be employed as far as a light emitting material comprising said polymeric fluorescent substance is used in the light emitting layer provided between a pair of electrodes at least one of which is transparent or semi-transparent.

Examples of such structures include one in which a pair of electrodes are provided on both sides of the light emitting layer comprising the polymeric fluorescent substance or comprising a mixture of the polymeric fluorescent substance and a charge transport material, which is a generic term for electron transport material and hole transport material, and one in which an electron transport layer containing an electron transport material is laminated between a cathode and a light emitting layer in adjacency to the light emitting layer and/or in which a hole transport layer containing a hole transport material is laminated between an anode and a light emitting layer, in adjacency to the light emitting layer.

The light emitting layer and the charge transport layer may each be provided as a single layer or as a combination of two or more layers, all of which embodiments are embraced in the scope of the present invention. Further, a light emitting material (or materials) other than the polymeric fluorescent substance, such as mentioned below, may be mixed in the light emitting layer. Also, the light emitting layer may be formed by dispersing the polymeric fluorescent substance and/or charge transport material in a polymeric compound.

As for the charge transport material (electron transport material or hole transport material) used with a polymeric fluorescent substance of this invention, such material is not specified and the known types can be used in this invention. For example, as hole transport material, there can be used pyrazoline derivatives, arylamine derivatives, stilbene derivatives, triphenyldiamine derivatives and the like. As electron transport material, there can be used oxadiazole derivatives, anthraquinodimethane and its derivatives, benzoquinone and its derivatives, naphthoquinone and its derivatives, anthraquinone and its derivatives, tetracyanoanthraquinodimethane and its derivatives, fluorenone derivatives, diphenyldicyanoethylene and its derivatives, diphenoquinone derivatives, and metal complexes of 8-hydroxyquinoline and its derivatives and the like. More concrete examples of these materials are shown in JP-A-63-70257, JP-A-63-175860, JP-A-2-135359, JP-A-2-135361, JP-A-2-209988, JP-A-3-37992 and JP-A-3-152184. As hole transport material, triphenyldiamine derivatives are preferably used, and as electron transport material, oxadiazole derivatives, benzoquinone and its derivatives, anthraquinone and its derivatives, and metal complexes of 8-hydroxyquinoline and its derivatives are preferably used. More specifically, 4,4'-bis(N(3-methylphenyl)-N-phenylamino)biphenyl is preferred as hole transport material, and 2-(4-biphenylyl)-5-(4-t-butylphenyl)-1,3,4-oxadiazole, benzoquinone, anthraquinone and tris(8-quinolinol)aluminum are preferred as electron transport material.

In the present invention, one of these electron transport and hole transport compounds or both of them may be used at the same time. Also, these compounds may be used either singly or as a mixture of two or more of them.

When providing a charge transport layer between a light emitting layer and an electrode, it is formed by using the charge transport material(s).

When a charge transport material is mixed in the light emitting layer, the amount thereof used varies depending on the type of the compounds used and other factors, so that it is properly decided considering these factors within the amount range in which the film-forming properties and the luminous properties of the compounds are not impaired. Usually, charge transport material is used in an amount of 1 to 40 wt %, preferably 2 to 30 wt % based on the light emitting material.

The light emitting material usable with a polymeric fluorescent substance of this invention is not specified; for example, there can be used naphthalene derivatives, anthracene and its derivatives, perylene and its derivatives, dyes such as polymethine dyes, xanthene dyes, coumarin dyes and cyanine dyes, metal complexes of 8-hydroxyquinoline and its derivatives, aromatic amines, tetraphenylcyclopentadiene and its derivatives, tetraphenylbutadiene and its derivatives. More specifically, those mentioned in JP-A-57-51781 and JP-A-59-194393 can be used.

A preferred process for producing an organic EL device using a light emitting material of this invention is described below.

A pair of transparent or semi-transparent electrodes, consisting of anode and cathode, are provided on a transparent substrate made of glass, transparent plastic or the like.

As anode material, a conductive metal oxide film, a semi-transparent thin metallic film or the like is used. Specifically, a film formed by using conductive glass composed of indium-tin-oxide (ITO), tin oxide, etc., or a film of Au, Pt, Ag, Cu or the like is used. Known film forming techniques such as vacuum deposition, spattering, plating, etc., can be employed for forming said film.

On this anode is formed a light emitting layer containing the polymer or the polymer and charge transport material. This light emitting layer can be formed by coating a polymer solution, a mixed solution of the materials or a molten polymer on the anode by a known coating method such as spin coating, casting, dipping, bar coating, roll coating, etc. Preferably, a film is formed by coating said solution or mixed solution by spin coating, casting, dipping, bar coating or roll coating.

The light emitting layer thickness is 0.5 nm to 10 μm, preferably 1 nm to 1 μm. A thickness in a range of 10 to 500 nm is preferred for increasing current density to elevate luminous efficiency.

When a thin film was formed by said coating method, the formed film is preferably dried by heating at 30°–200° C., preferably 60°–100° C., under reduced pressure or an inert atmosphere for removing the solvent.

When forming a laminate of said light emitting layer and charge transport layer, preferably a hole transport layer is formed on the anode before the light emitting layer is provided by the above coating method, and/or after the light emitting layer is provided, an electron transport layer is formed thereon.

The method for forming the charge transport layer is not specified in this invention; for example, it may be formed by vacuum deposition of a charge transport material in a powdery form, or by coating a solution of said material by an appropriate coating method such as spin coating, casting, dipping, bar coating, roll coating, etc., or by mixing and dispersing a polymeric compound and a charge transport material in a molten state or a state of solution and coating the suspension by a suitable coating method such as spin coating, casting, dipping, bar coating, roll coating, etc. The polymeric compound to be mixed is not specified, but such polymeric compound is preferably one which does not impede charge transport to any significant degree. Also, a compound which does not have strong visible light absorptivity is preferably used. Examples of such compounds are poly(N-vinylcarbazole), polyaniline and its derivatives, polythiophene and its derivatives, poly(p-phenylene vinylene) and its derivatives, poly(2,5-thienylene vinylene) and its derivatives, polycarbonates, polyacrylates, polymethyl acrylate, polymethylmethacrylate, polystyrenes, polyvinyl chloride, and polysiloxanes. For forming the film, coating method is preferably employed because of easy formation of the film.

The thickness of the charge transport layer needs to be large enough to prevent formation of pinholes, but a too large thickness is undesirable as it increases element resistance to necessitate a high drive voltage. In view of this, the recommended thickness of the charge transport layer is 0.5 nm to 10 μm, preferably 1 nm to 1 μm, more preferably 5 to 200 μm.

Then an electrode is provided on the light emitting layer or electron transport layer. This electrode serves as an electron injection cathode. The material thereof is not specified, but a material with small work function is preferred. For example, Al, In, Mg, Mg-Ag alloy, In-Ag alloy, Mg-In alloy and graphite can be used. Vacuum deposition, spattering or other suitable techniques may be used for forming the cathode.

The most remarkable feature of the polymeric fluorescent substance of this invention in use as a light emitting material is that because of relatively high melting point and decomposition temperature, it is thermally stable, high in quantum yield of fluorescence and capable of forming a highly homogeneous light emitting layer with ease by a coating method, and it therefore allows very easy manufacture of high-luminance and low-drive-voltage organic EL devices.

The present invention is further illustrated below with reference to the examples, which are merely intended to be illustrative and not to be construed as limiting the scope of the invention.

EXAMPLE 1

<Synthesis of Polymeric Fluorescent Substance 1>

2,5-diheptyloxy-p-xylylene dibromide was reacted with triphenylphosphine in N,N-dimethylformamide to synthesize a phosphonium salt A. Meanwhile, p-hydroxybenzaldehyde was reacted with potassium hydroxide in ethanol to form potassium phenolate and the latter was further reacted with 1,6-dibromo-n-hexane to synthesize a dialdehyde compound B. 10.2 parts by weight of phosphonium salt A, 1.62 parts by weight of dialdehyde compound B and 0.67 parts by weight of terephthalaldehyde were dissolved in ethanol. An ethanol solution containing 1.56 parts by weight of lithium ethoxide was added dropwise into this ethanol solution of phosphonium salt and dialdehyde and polymerized at room temperature for 3 hours. The reaction solution was left at room temperature overnight and the precipitate was filtered out, washed with ethanol, dissolved in chloroform and reprecipitated with ethanol. The resultant product was dried in vacuo to obtain 2.3 parts by weight of a polymer. This polymer is called polymeric fluorescent substance 1.

The repeating units of the obtained polymeric fluorescent substance 1 and their molar ratio are shown below.

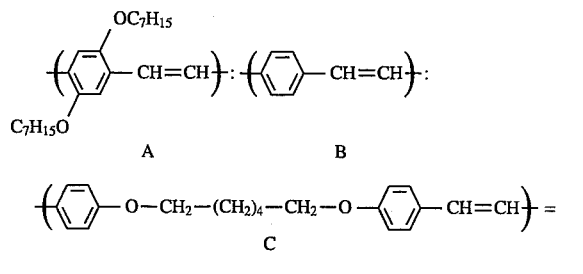

50:25:25

The number-average molecular weight of the polymeric fluorescent substance 1, calculated as polystyrene by gel permeation chromatography (GPC) using chloroform as solvent, was $1.3 \times 10^4$. The structure of said polymeric fluorescent substance 1 was confirmed by infrared absorption spectrum and NMR.

<Measurement of Fluorescent Spectrum and Evaluation of Quantum Yield of Fluorescence>

The polymeric fluorescent substance 1 could be easily dissolved in chloroform. A 0.05% chloroform solution of this polymeric fluorescent substance was spin coated on a quartz plate to form a thin film of said polymer. The fluorescence spectrum of this thin film was measured by Fluorospectrophotometer 850 of Hitachi Ltd. The fluorescence spectrum of the film when excited at 410 nm was used for calculation of quantum yield of fluorescence. Intensity of fluorescence was shown as relative value determined by dividing the area of fluorescence spectrucm plotted with wavelength as abscissa by absorbance at 410 nm. Fluorescence intensity (relative value of quantum yield of fluorescence) of the polymeric fluorescent substance 1 was high as seen from Table 1.

<Manufacture and Evaluation of EL Device>

To a glass substrate deposited with a 40 nm thick ITO film by spattering, a 1.0 wt % chloroform solution of the polymeric fluorescent substance was dip-coated to form a 50 nm thick film on said substrate. The coating film was dried in vacuo at 80° C. for one hour and then tris(8-quinolinol)aluminum (which may hereinafter be abbreviated as Alq$_3$) was deposited thereon at a rate of 0.1–0.2 nm/sec to form a 70 nm thick electron transport layer. Lastly a magnesium-silver alloy (Mg:Ag=9:1 by weight) was deposited thereon to a thickness of 150 nm as cathode to make an organic EL device. The degree of vacuum in which deposition was carried out was below $8 \times 10^{-6}$ Torr in all cases.

When a voltage of 11.0 V was applied to this device, there was induced a flow of electricity with a current density of 225 mA/cm$^2$ and yellowish green electroluminesence with a luminance of 2,780 cd/m$^2$ was observed. Luminance was almost proportional to current density. The EL peak wavelength was about 540 nm, which substantially agreed with the peak wavelength of fluorescence of the thin film of polymeric fluorescent substance 1, whereby electroluminescence from the polymeric fluorescent substance 1 was confirmed.

EXAMPLE 2

<Synthesis of Polymeric Fluorescent Substance 2>

2,5-dioctyloxy-p-xylylene dibromide was reacted with triphenylphosphine in N,N-dimethylformamide to synthesize a phosphonium salt C. 10.5 parts by weight of this phosphonium salt C, 1.62 parts by weight of the dialdehyde compound B obtained in Example 1 and 1.05 parts by weight of 4,4'-diformylbiphenyl were dissolved in ethanol. An ethanol solution containing 1.56 parts by weight of lithium ethoxide was added dropwise into the ethanol solution of phosphonium salt and dialdehyde and polymerized at room temperature for 3 hours. The reaction solution was left at room temperature overnight and the precipitate was filtered out, washed with ethanol, dissolved in chloroform and reprecipitated with ethanol. The resulting product was dried in vacuo to obtain 3.2 parts by weight of a polymer. This polymer is called polymeric fluorescent substance 2.

The repeating units of the obtained polymeric fluorescent substance 2 and their molar ratio are shown below.

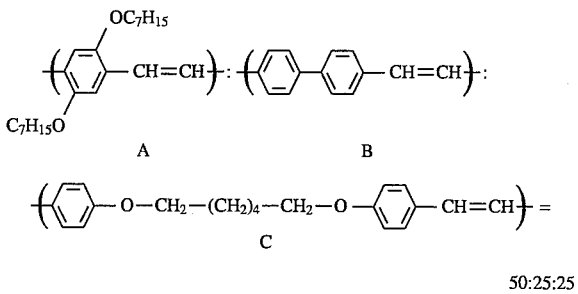

50:25:25

The number-average molecular weight of the polymeric fluorescent substance 2, calculated as polystyrene, was $1.4 \times 10^4$.

<Measurement of Fluorescence Spectrum and Evaluation of Quantum Yield of Fluorescence>

An organic EL device was produced by following the same procedure as in Example 1 except for use of polymeric fluorescent substance 2 in place of polymeric fluorescent substance 1. When a voltage of 10.8 V was applied to this device, there was generated a current of electricity with a current density of 58 mA/cm² and bluish green electroluminescence with a luminance of 1034 cd/m² was observed. Luminance was almost proportional to current density. The EL peak wavelength was about 500 nm, which substantially agreed with the peak wavelength of fluorescence of the thin with the peak wavelength of fluorescence of the thin film of polymeric fluorescent substance 2, by which electroluminescence from the polymeric fluorescent substance 2 was confirmed.

EXAMPLE 3

<Synthesis of Polymeric Fluorescent Substance 3>

10.5 parts by weight of phosphonium salt C obtained in Example 2, 2.6 parts by weight of dialdehyde compound B obtained in Example 1 and 0.27 parts by weight of terephthalaldehyde were dissolved in ethanol. An ethanol solution containing 1.56 parts by weight of lithium ethoxide was added dropwise into the ethanol solution of phosphonium salt and dialdehyde and polymerized at room temperature for 3 hours. The reaction solution was left at room tempera-ture overnight and the precipitate was filtered out, washed with ethanol, dissolved in chloroform and reprecipitated with ethanol. The resulting product was dried in vacuo to obtain 2.7 parts by weight of a polymer. This polymer is called polymeric fluorescent substance 3.

The repeating units of the obtained polymeric fluorescent substance 3 and their molar ratio are shown below.

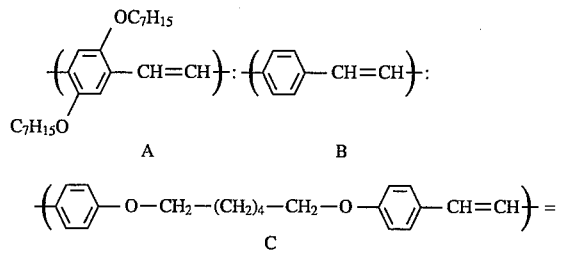

50:10:40

The number-average molecular weight of this polymeric fluorescent substance 3, calculated as polystyrene, was $1.0 \times 10^4$.

<Measurement of Fluorescence Spectrum and Evaluation of Quantum Yield of Fluorescence>

The intensity of fluorescence and peak wavelength of the fluorescence spectrum were determined in the same way as in Example 1. The intensity of fluorescence of the polymeric fluorescent substance 3 was high as shown in Table 1.

<Manufacture and Evaluation of EL Device>

An organic EL device was produced by following the same procedure as Example 1 except for use of polymeric fluorescent substance 3 in place of polymeric fluorescent substance 1. When a voltage of 12.5 V was applied to the device, there was caused a current of electricity with a current density of 283 mA/cm² and green electroluminescence with a luminance of 4,390 cd/m² was observed. Luminance was almost proportional to current density. The EL peak wavelength was about 522 nm, which substantially agreed with the peak wavelength of fluorescence of the thin film of polymeric fluorescent substance 3, which confirmed electroluminescence from the polymeric fluorescent substance 3.

Comparative Example 1

<Synthesis of Polymeric Fluorescent Substance 4>

7.4 parts by weight of phosphonium salt A obtained in Example 1 and 1.0 part by weight of terephthalaldehyde were dissolved in ethanol. An ethanol solution containing 0.9 parts by weight of lithium ethoxide was added dropwise into the ethanol solution of phosphonium salt and dialdehyde and polymerized at room temperature for 3 hours. The reaction solution was left at room temperature overnight and the precipitate was filtered out, washed with ethanol, dissolved in chloroform and reprecipitated with ethanol. The resulting product was dried in vacuo to obtain 1.5 parts by weight of a polymer. This polymer is called polymeric fluorescent substance 4.

The repeating units of this polymeric fluorescent substance 4 and their molar ratio are shown below.

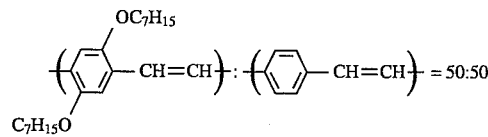

The number-average molecular weight of the polymeric fluorescent substance 4, calculated as polystyrene, was $1.0 \times 10^4$.

<Measurement of Fluorescence Spectrum and Evaluation of Quantum Yield of Fluorescence>

The intensity of fluorescence and peak wavelength of the fluorescence spectrum were determined in the same way as in Example 1. The intensity of fluorescence of the polymeric fluorescent substance 4 was lower than that of the polymeric fluorescent substance 1 of Example 1 as shown in Table 1.

<Manufacture and Evaluation of EL Device>

An organic EL device was produced by following the procedure of Example 1 except for use of polymeric fluorescent substance 4 in place of polymeric fluorescent substance 1. When a voltage of 12.3 V was applied to this device, there was induced a flow of electricity with a current density of 760 mA/cm² and yellowish green electroluminescence with a luminance of 2,770 cd/m² was observed. Luminance was almost proportional to current density. The EL peak wavelength was about 550 nm, which substantially agreed with the peak wavelength of fluorescence of the thin film of polymeric fluorescent substance 4, by which electroluminescence from the polymeric fluorescent substance 4 was confirmed.

Comparative Example 2

<Synthesis of Polymeric Fluorescent Substance 5>

10.2 parts by weight of phosphonium salt A and 3.2 parts by weight of dialdehyde compound B, both obtained in Example 1, were dissolved in 70 parts by weight of ethanol. In a separate operation, 0.3 parts by weight of lithium was reacted with 70 parts by weight of ethanol to obtain lithium ethoxide. A solution of this lithium ethoxide was added dropwise into the ethanol solution of phosphonium salt and dialdehyde and polymerized at room temperature according to Wittig reaction. The precipitate was filtered out, washed with ethanol and dried to obtain 0.5 parts by weight of a polymer. This polymer is called polymeric fluorescent substance 5.

The repeating units of the obtained polymeric fluorescent substance 5 and their molar ratio are shown below.

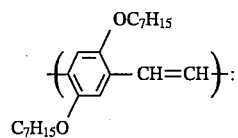

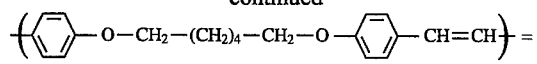

= 50:50

The number-average molecular weight of this polymeric fluorescent substance 5, calculated as polystyrene, was $6.9 \times 10^3$.

<Measurement of Fluorescence Spectrum and Evaluation of Quantum Yield of Fluorescence>

The intensity of fluorescence was determined in the same way as in Example 1. The intensity of fluorescence of the polymeric fluorescent substance 5 was higher than that of the polymeric fluorescent substance 1 of Example 1 as shown in Table 1.

<Manufacture and Evaluation of EL Device)

An organic EL device was produced by following the same procedure as in Example 1 except for use of the polymeric fluorescent substance 5 in place of the polymeric fluorescent substance 1. When a voltage of 12.8 V was applied to this device, there was induced an electric current of 175 mA/cm² and bluish green electroluminescence with a luminance of 740 cd/m² was observed. Luminance was almost proportional to current density. The EL peak wavelength was about 500 nm, which substantially agreed with one of the peak wavelengths (504 and 528 nm) of fluorescence of the thin film of polymeric fluorescent substance 5, by which electroluminescence from the polymeric fluorescent substance 5 was confirmed.

TABLE 1

| | EL properties | | | | | Quantum yield of fluorescence (arbitrary unit) |
|---|---|---|---|---|---|---|
| | Voltage (V) | Current density (mA/cm²) | Luminance (cd/m²) | Luminous efficiency (cd/A) | EL peak wavelength (nm) | |
| Example 1 | 11.0 | 225 | 2780 | 1.24 | 540 | 17.7 |
| Example 2 | 12.5 | 371 | 6068 | 1.64 | 500 | 25.2 |
| Example 3 | 12.5 | 283 | 4390 | 1.55 | 522 | 39.7 |
| Comp. Example 1 | 12.3 | 760 | 2770 | 0.36 | 550 | 7.5 |
| Comp. Example 2 | 12.8 | 175 | 740 | 0.42 | 500 | 50.5 |

As is seen from the above, the polymeric fluorescent substance 1, 2 and 3 of Examples 1, 2 and 3 were excellent in both electric conductivity and quantum efficiency, and the organic EL devices produced by using these polymeric fluorescent substances showed excellent electroluminsecent properties such as prominently high luminous efficiency as compared with the organic EL devices of Comparative Examples 1 and 2.

EXAMPLE 4

<Synthesis of Polymeric Fluorescent Substance 6>

2,5-diethyl-p-xylylene dibromide was reacted with triphenylphosphine in N,N-dimethylformamide to synthesize a phosphonium salt D. 4.1 parts by weight of this phosphonium salt D, 1.0 part by weight of phosphonium salt A obtained in Example 1 and 0.8 parts by weight of terephthalaldehyde were dissolved in ethanol. An ethanol solution containing 0.8 parts by weight of lithium ethoxide was added dropwise into the ethanol solution of phosphonium salt and dialdehyde and polymerized at room temperature for 3 hours. The reaction solution was left at room temperature overnight and the precipitate was filtered out, washed with ethanol, dissolved in chloroform and reprecipitated with ethanol. The resulting product was dried in vacuo to obtain 0.35 parts by weight of a polymer. This polymer is called polymeric fluorescent substance 6. The repeating units of this polymeric fluorescent substance 6 and their molar ratio are shown below.

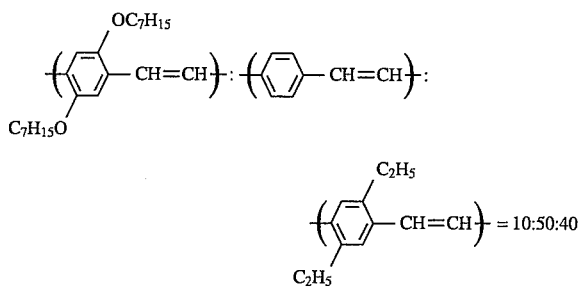

The number-average molecular weight of the polymeric fluorescent substance 6, calculated as polystyrene, was 5.0× $10^3$. Regarding the structure of the polymeric fluorescent substance 6, absorptions due to vinylene group at 960 cm$^{-1}$, phenylene group at 1520 cm$^{-1}$, ether group at 1100 cm$^{-1}$ and alkyl group at 2860 cm$^{-1}$ were observed on the infrared absorption spectrum.

<Measurement of Absorption Spectrum and Fluorescence Spectrum and Evaluation of Quantum Yield of Fluorescence>

The fluorescence spectrum was measured and the intensity and peak wavelength of fluorescence were determined in the same way as in Example 1. Also, the ultraviolet visible absorption spectrum was measured by using Autographic Spectrophotometer UV 365 of Shimadzu Corp. to determine absorption peak wavelength.

The intensity of fluorescence (relative value of quantum yield of fluorescence) of the polymeric fluorescent substance was very high as shown in Table 2. The difference between peak wavelength on absorption spectrum of the thin film and peak wavelength on its fluorescence spectrum was 135 nm.

EXAMPLE 5

<Synthesis of Polymeric Fluorescent Substance 7, Measurement of Absorption and Fluorescence Spectra and Evaluation of Quantum Yield of Fluorescence>

12.7 parts by weight of phosphonium salt D obtained in Example 4, 2.09 parts by weight of phosphonium salt A obtained in Example 1 and 2.28 parts by weight of terephthalaldehyde were dissolved in ethanol. An ethanol solution containing 2.66 parts by weight of lithium ethoxide was added dropwise into the ethanol solution of phosphonium salts and dialdehyde and polymerized at room temperature for 3 hours. The reaction solution was left at room temperature overnight and the precipitate was filtered out, washed with ethanol, dissolved in chloroform and reprecipitated with ethanol. The resulting product was dried in vacuo to obtain 2.28 parts by weight of a polymer. This polymer is called polymeric fluorescent substance 7. The repeating units of this polymeric fluorescent substance 7 and their molar ratio are shown below.

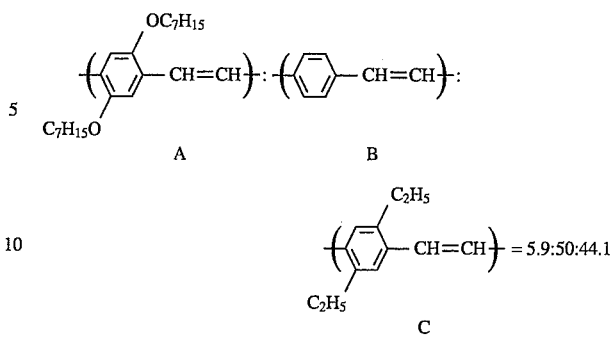

The number-average molecular weight of the polymeric fluorescent substance 7, calculate as polystyrene, was 8.4× $10^3$. The intensity of fluorescence and peak wavelength on the fluorescence spectrum were determined in the same way as in Example 1, and the absorption peak wavelength was determined by the method of Example 4.

The intensity of fluorescence of the polymeric fluorescent substance 7 was very high as shown in Table 2. The difference between peak wavelength on absorption spectrum of the thin film and peak wavelength on its fluorescence spectrum was 129 nm.

Comparative Example 3

<Synthetis of Polymeric Fluorecent Substance 4, Measurement of Fluorescence Spectrum and Evaluation of Quantum Yield of Fluorescence>

Regarding the polymeric fluorescent substance 4 synthesized in Comparative Example 1, the intensity of its fluorescence and the peak wavelength on its fluorescence spectrum were determined in the same way as in Example 1 and the peak wavelength on the absorption spectrum was determined by the method of Example 4. The intensity of fluorescence of the polymeric fluorescent substance 4 was weak as shown in Table 2, and the difference between peak wavelength on the absorption spectrum of the thin film and peak wavelength on its fluorescence spectrum was only 85 nm.

Comparative Example 4

<Synthesis of Polymeric Fluorescent Substance 8, Measurement of Absorption and Fluorescence Spectra and Evaluation of Quantum Yield of Fluorescence>

A xylene solution containing 3.0 parts by weight of 2,5-diheptyloxy-p-xylylene dibromide was added dropwise into a tert-butanol solution containing 30 parts by weight of t-butoxy potassium and refluxed under heating for 7 hours. The polymerization solution was cooled to room temperature and poured into methanol. The red precipitate that formed was filtered out, washed with methanol and ethanol, dissolved in chloroform and reprecipitated with ethanol. The resulting product was dried in vacuo to obtain 1.0 part by weight of a polymer. This polymer is called polymeric fluorescent substance 8. The repeating units of this polymeric fluorescent substance 8 are shown below.

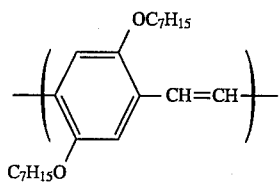

The number-average molecular weight of the polymeric fluorescent substance 8, calculated as polystyrene, was $6.0 \times 10^4$. The intensity of fluorescence and peak wavelength on the fluorescence spectrum were measured in the same way as in Example 1, and the peak wavelength on the absorption spectrum was determined by the method of Example 4. The intensity of fluorescence of the polymeric fluorescent substance 8 was weak as shown in Table 2. The difference between peak wavelength on absorption spectrum of the thin film and peak wavelength on its fluorescence spectrum was only 95 nm.

TABLE 2

| Polymer | Absorption peak (nm) | Fluorescence peak (nm) | Difference (nm) | Optical absorption edge energy*) (eV) | | Quantum yield of fluorescence (relative value) |
|---|---|---|---|---|---|---|
| | | | | Maximum | Minimum | |
| Example 4 | 395 | 530 | 135 | 2.45 | 2.17 | 17.3 |
| Example 5 | 395 | 524 | 129 | 2.45 | 2.17 | 12.4 |
| Comp. Example 3 | 455 | 540 | 85 | 2.38 | 2.17 | 7.5 |
| Comp. Example 4 | 485 | 578 | 95 | 2.17 | 2.17 | 5.0 |

*)The values of the homopolymer composed of one repeating structural unit.

As is seen from the above, the polymeric fluorescent substance 6 and 7 of Examples 4 and 5 had very high quantum yield of fluorescence as compared with the polymeric fluorescent substances 4 and 8 of Comparative Examples 3 and 4.

EXAMPLE 6

<Manufacture and Evaluation of EL Device>

An organic EL device was produced by following the procedure of Example 1 except for use of the polymeric fluorescent substance 6 synthesized in Example 4 in place of the polymeric fluorescent substance 1 synthesized in Example 1. When a voltage of 10.0 V was applied to this device, there was generated an electric current of 158 mA/cm² and yellowish green electroluminescence with a luminance of 649 cd/m² was observed. Luminance was proportional to current density. The EL spectrum substantially agreed with the fluorescence spectrum of the thin film of the polymeric fluorescent substance 6, which confirmed electroluminescence from the polymeric fluorescent substance 6.

EXAMPLE 7

<Manufacture of EL Device and its Evaluation>

An organic EL device was produced by following the procedure of Example 1 except for use of the polymeric fluorescent substance 7 synthesized in Example 5 in place of the polymeric fluorescent substance 1 synthesized in Example 1. When a voltage of 9.2 V was applied to this device, there was induced a flow of electricity with a current density of 74 mA/cm² and yellowish green electroluminescence with a luminance of 1,104 cd/m² was observed. Luminance was proportional to current density. The EL spectrum substantially agreed with the fluorescence spectrum of the thin film of the polymeric fluorescent substance 7, whereby electroluminescence from the polymeric fluorescent substance 7 was confirmed.

What is claimed is:

1. An organic electroluminescence device at least having a light emitting layer between two electrodes consisting of an anode and a cathode forming a counterpart thereto at least one of which electrodes is transparent or semi-transparent, wherein said light emitting layer comprises a polymeric fluorescent substance which is soluble in organic solvents, has a number-average molecular weight of $10^3$ to $10^7$ and contains, as main constituents, three different repeating units A, B and C selected from the repeating units presented by the following formula (1), wherein the ratios of the respective repeating units in the polymeric substance are such that when the repeating unit constituting the polymer having the longest optical absorption edge wavelength is expressed by A, the repeating unit constituting the polymer having the next longest absorption edge wavelength is expressed by B and the repeating unit constituting the polymer having the shortest optical absorption edge wavelength is expressed by C, A is contained in an amount of 2–60 mol %, B in an amount of 5 . 60 mol % and C in an amount of 20–50 mol % based on the total number of the three different repeating units:

wherein Ar is an arylene group having 6 to 20 carbon atoms, a heterocyclic compound group having 4 to 20 carbon atoms or a divalent group represented by the following formula (2) and at least one of the repeating units At B and C has at least one substituent group selected from an alkyl group, an alkoxy group and an alkythio group having 2 to 22 carbon atoms, an aryl group and an aryloxy group having 6 to 60 carbon atoms and a heterocyclic compound group having 4 to 60 carbon atoms:

wherein $Ar_1$ and $Ar_2$ are respectively an arylene group having 6 to 20 carbon atoms or a heterocyclic compound group having 4 to 20 carbon atoms and optionally containing at least one substituent of at least one species of a group selected from an alkyl group, an alkoxy group and an alkylthio group having 2 to 22 carbon atoms, an aryl group and an aryloxy group having 6 to 60 carbon atoms and a heterocyclic compound group having 4 to 60 carbon atoms; R is a hydrocarbon or a heterocyclic compound group having 1 to 22 carbon atoms;
and $X_1$ and $X_2$ represent independently —O—, —S—, —COO— or —OCO—.

2. An organic electroluminescence device at least having a light emitting layer between two electrodes consisting of an anode and a cathode forming a counterpart thereto at least one of which electrodes is transparent or semi-transparent, wherein said light emitting layer comprises a polymeric fluorescent substance which is soluble in organic solvents, has a number-average molecular weight of $10^3$ to $10^7$ and contains, as main constituents, three different repeating units A, B and C selected from the repeating units represented by the following formula (1), wherein the ratios of the respective repeating units in the polymeric substance are such that when the repeating unit constituting the polymer having the longest optical absorption edge wavelength is expressed by A, the repeating unit constituting the polymer having the next longest optical absorption edge wavelength is expressed by B and the repeating unit constituting the polymer having the shortest optical absorption edge wavelength is expressed by C, A is contained in an amount of 2–60 mol %, B in an amount of 5–60 mol % and C in an amount of 20–50 mol % based on the total number of the three different repeating units:

wherein Ar is an arylene group having 6 to 20 carbon atoms, a heterocyclic compound group having 4 to 20 carbon atoms or a divalent group represented by the following formula (2), and at least one of the repeating units A, B and C has at least one substituent group selected from an alkyl group, an alkoxy group and an alkythio group having 2 to 22 carbon atoms, an aryl group and an aryloxy group having 6 to 60 carbon atoms and a heterocyclic compound group having 4 to 60 carbon atoms:

—Ar$_1$—X$_1$—R—X$_2$—Ar$_2$—  (2)

wherein Ar$_1$ and Ar$_2$ are respectively an arylene group having 6 to 20 carbon atoms or a heterocyclic compound group having 4 to 20 carbon atoms and optionally containing at least one substituent of at least one species of a group selected from an alkyl group, an alkyl group, an alkoxy group and an alkylthio group having 2 to 22 carbon atoms, an aryl group and an aryloxy group having 6 to 60 carbon atoms and a heterocyclic compound group having 4 to 60 carbon atoms;
R is a hydrocarbon or heterocyclic compound group having 1 to 22 carbon atoms;
and $X_1$ and $X_2$ represent independently —O—, —S—, —COO— or —OCO—, and a layer comprising an electron transport compound is provided between said cathode and said light emitting layer, in adjacency to said light emitting layer.

3. An organic electroluminesence device at least having a light emitting layer between two electrodes consisting of an anode and a cathode forming a counterpart thereto at least one of which electrodes is transparent or semi-transparent, wherein said light emitting layer comprises a polymeric fluorescent substance which is soluble in organic solvents, has a number-average molecular weight of $10^3$ to $10^7$ and contains, as main constituents, three different repeating units A, B and C selected from the repeating units represented by the following formula (1), wherein the ratios of the respective repeating units in the polymeric substance are such that when the repeating unit constituting the polymer having the longest optical absorption edge wavelength is expressed by A, the repeating unit constituting the polymer having the next longest optical absorption edge wavelength is expressed by B and the repeating unit constituting the polymer having the shortest optical absorption edge wavelength is expressed by C, A is contained in an amount of 2–60 mol %, B in an amount of 5–60 mol % and C in an amount of 20–50 mol % based on the total number of the three different repeating units:

wherein Ar is an arylene group having 6 to 20 carbon atoms, a heterocyclic compound group having 4 to 20 carbon atoms or a divalent group represented by the following formula (2), and at least one of the repeating units A, B and C has at least one substituent group selected from an alkyl group, an alkoxy group and an alkythio group having 2 to 22 carbon atoms, an aryl group and an aryloxy group having 6 to 60 carbon atoms and a heterocyclic compound group having 4 to 60 carbon atoms:

—Ar$_1$—X$_1$—R$_2$—Ar$_2$—  (2)

wherein Ar$_1$ and Ar$_2$ are respectively an arylene group having 6 to 20 carbon atoms or heterocyclic compound group having 4 to 20 carbon atoms and optionally containing at least one substituent of at least one species of a group selected from an alkyl group, an alkoxy group and an alkylthio group having 2 to 22 carbon atoms, an aryl group and an aryloxy group having 6 to 60 carbon atoms and a heterocyclic compound group having 4 to 60 carbon atoms;
R is a hydrocarbon or a heterocyclic compound group having 1 to 22 carbon atoms;
and $X_1$ and $X_2$ represent independently —O—, —S—, or —OCO—, and a layer comprising a hole transport compound is provided between said anode and said light emitting layer, in adjacency to said light emitting layer.

4. An organic electroluminescence device at least having a light emitting layer between two electrodes consisting of an anode and a cathode forming a counterpart thereto at least one of which electrodes is transparent or semi-transparent, wherein said light emitting layer comprises a polymeric fluorescent substance which is soluble in organic solvents, has a number-average molecular weight of $10^3$ to $10^7$ and contains, as main constituents, three different repeating units A, B and C selected from the repeating units represented by the following formula (1), wherein the ratios of the respective repeating units in the polymeric substance are such that when the repeating unit constituting the polymer having the longest optical absorption edge wavelength is expressed by A, the repeating unit constituting the polymer having the next longest optical absorption edge wavelength is expressed by B and the repeating unit constituting the polymer having the shortest optical absorption edge wavelength is expressed by C, A is contained in an amount of 2–60 mol %, B in an amount of 5–60 mol % and C in an amount of 20–50 mol % based on the total number of the three different repeating units:

$$—Ar—CH=CH— \quad (1)$$

Ar is an arylene group having 6 to 20 carbon atoms, a heterocyclic compound group having 4 to 20 carbon atoms or a divalent group represented by the following formula (2), and at least one of the repeating units A, B and C has at least one substituent group selected from an alkyl group, an alkoxy group and an alkythio group having 2 to 22 carbon atoms, an aryl group and an aryloxy group having 6 to 60 carbon atoms and a heterocyclic compound group having 4 to 60 carbon atoms;

$$—Ar_1—X_1—R—X_2—Ar_2— \quad (2)$$

wherein $Ar_1$ and $Ar_2$ are respectively an arylene group having 6 to 20 carbon atoms or a heterocyclic compound group having 4 to 20 carbon atoms and optionally containing at least one substituent of at least one species of a group selected from an alkyl group, an alkoxy group and an alkylthio group having 2 to 22 carbon atoms, an aryl group and an aryloxy group having 6 to 60 carbon atoms and a heterocyclic compound group having 4 to 60 carbon atoms; R is a hydrocarbon or a heterocyclic compound group having 1 to 22 carbon atoms; and $X_1$ and $X_2$ represent independently —O—, —S—, —COO— or —OCO—;

- a layer comprising an electron transport compound is provided between said cathode and said light emitting layer, in adjacency to said light emitting layer, and
- a layer comprising a hole transport compound is provided between said anode and said light emitting layer, in adjacency to said light emitting layer.

5. An organic electroluminescence device according to any one of claims 1, 2, 3 or 4, wherein $X_1$ and $X_2$ in the formula (2) are —O—.

6. An organic electroluminescence device according to any one of claims 1, 2, 3 or 4, wherein the Ar groups in the repeating units A, B and C are an arylene group having 6 to 20 carbon atoms or a heterocyclic compound group having 4 to 20 carbon atoms, at least one of said Ar groups having at least one substituent of at least one species of a group selected from an alkyl group, an alkoxy group and an alkylthio group having 2 to 22 carbon atoms, an aryl group and an aryloxy group having 6 to 60 carbon atoms and a heterocyclic compound group having 4 to 60 carbon atoms, and a difference between peak wavelength of an absorption spectrum and a peak wavelength of a fluorescence spectrum of a thin film of said polymeric fluorescence substance is 120 nm or greater.

7. An organic electroluminescence device according to claim 6, comprising a polymeric fluorescent substance containing the repeating units represented by the following formulae (3) and (4):

$$—Ar_3—CH=CH—Ar_4—CH=CH— \quad (3)$$

$$—Ar_5—CH=CH—Ar_4—CH=CH— \quad (4)$$

wherein $Ar_3$, $Ar_4$ and $Ar_5$ are different from each other and each represents an arylene or heterocyclic compound group forming a conjugated bond linked to a vinylene group, and at least one of $Ar_3$, $Ar_4$ and $Ar_5$ is an arylene group or a heterocyclic compound group having at least one substituent of at least one species of a group selected from an alkyl group, an alkoxy group and an alkylthio group having 2 to 22 carbon atoms, an aryl group and an aryloxy group having 6 to 60 carbon atoms and a heterocyclic compound group having 4 to 60 carbon atoms.

* * * * *

UNITED STATES PATENT AND TRADEMARK OFFICE
CERTIFICATE OF CORRECTION

PATENT NO. : 5,589,320

DATED : December 31, 1996

INVENTOR(S) : Toshihiro Ohnishi et al

It is certified that error appears in the above-identified patent and that said Letters Patent is hereby corrected as shown below:

Column 24, claim 3, formula 2, delete "$-Ar_1-X_1-R_2-Ar_2$", and insert -- $-Ar_1-X_1-R-X_2-Ar_2-$ --.

Signed and Sealed this

Twenty-second Day of July, 1997

Attest:

BRUCE LEHMAN

Attesting Officer

Commissioner of Patents and Trademarks